(12) United States Patent
Sanno

(10) Patent No.: US 12,541,992 B2
(45) Date of Patent: Feb. 3, 2026

(54) IMAGE PROCESSING APPARATUS, IMAGING APPARATUS, AND CONTROL METHOD FOR CONTROLLING IMAGE PROCESSING APPARATUS

(71) Applicant: CANON KABUSHIKI KAISHA, Tokyo (JP)

(72) Inventor: Masato Sanno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 18/456,305

(22) Filed: Aug. 25, 2023

(65) Prior Publication Data
US 2024/0071124 A1 Feb. 29, 2024

(30) Foreign Application Priority Data
Aug. 26, 2022 (JP) ................. 2022-135293

(51) Int. Cl.
| | | |
|---|---|---|
| G06V 40/10 | (2022.01) | |
| G03B 13/36 | (2021.01) | |
| G06F 3/04842 | (2022.01) | |
| G06T 7/20 | (2017.01) | |
| G06T 7/62 | (2017.01) | |

(52) U.S. Cl.
CPC ........... *G06V 40/103* (2022.01); *G03B 13/36* (2013.01); *G06F 3/04842* (2013.01); *G06T 7/20* (2013.01); *G06T 7/62* (2017.01); *G06V 2201/07* (2022.01)

(58) Field of Classification Search
CPC ........... G06V 40/103; G06T 7/62; G06T 7/20; G06F 3/04842

USPC ......................................................... 382/103
See application file for complete search history.

(56) References Cited

U.S. PATENT DOCUMENTS

| | | | | |
|---|---|---|---|---|
| 9,268,423 | B2 * | 2/2016 | Stone | G06F 3/0481 |
| 10,474,918 | B2 * | 11/2019 | Bamba | G06V 10/235 |
| 12,375,804 | B2 * | 7/2025 | Sanno | H04N 23/675 |
| 12,395,725 | B2 * | 8/2025 | Sanno | H04N 23/632 |
| 2015/0338942 | A1 * | 11/2015 | Stone | G06F 3/04845 |
| | | | | 345/173 |
| 2021/0158555 | A1 * | 5/2021 | Maeda | G06V 20/52 |
| 2021/0407048 | A1 * | 12/2021 | Tanaka | G06T 5/70 |
| 2023/0308756 | A1 * | 9/2023 | Sanno | H04N 23/61 |
| 2024/0071124 | A1 * | 2/2024 | Sanno | G06F 3/04845 |

FOREIGN PATENT DOCUMENTS

JP 2021125735 A 8/2021

\* cited by examiner

*Primary Examiner* — William D Titcomb
(74) *Attorney, Agent, or Firm* — Canon U.S.A., Inc. IP Division

(57) ABSTRACT

In a case where a user selects a plurality of types of detected objects while switching a main object using an operation member for indicating a direction, the user may select an object that the user is less likely to determine as a major object. An image processing apparatus determines whether to permit any of a plurality of objects to be reselected as a new main object according to whether a region of any of the plurality of objects overlaps a region of another object and a combination of a type of any of the plurality of objects and a type of the main object.

20 Claims, 9 Drawing Sheets

FIG.2

| 250 | R | Gr | R | Gr | R | Gr | R | Gr | R | Gr |
|---|---|---|---|---|---|---|---|---|---|---|
| 251 | Gb | AF | Gb | AF | Gb | AF | Gb | AF | Gb | AF |
| | R | Gr | R | Gr | R | Gr | R | Gr | R | Gr |
| | Gb | B | Gb | B | Gb | B | Gb | B | Gb | B |
| | R | Gr | R | Gr | R | Gr | R | Gr | R | Gr |
| | Gb | AF | Gb | AF | Gb | AF | Gb | AF | Gb | AF |
| | R | Gr | R | Gr | R | Gr | R | Gr | R | Gr |
| | Gb | B | Gb | B | Gb | B | Gb | B | Gb | B |

FIG.7

| | | TRANSITION OBJECT | | | | | | | | |
|---|---|---|---|---|---|---|---|---|---|---|
| | | PERSON | DOG | CAT | BIRD | HORSE | TWO-WHEEL VEHICLE | FOUR-WHEEL VEHICLE | TRAIN | AIRPLANE |
| MAIN OBJECT | PERSON | ○ | ○ | ○ | ○ | ○ | ○ | ○ | ○ | ○ |
| | DOG | ○ | ○ | ○ | ○ | ○ | × | ○ | ○ | ○ |
| | CAT | ○ | ○ | ○ | ○ | ○ | × | ○ | ○ | ○ |
| | BIRD | ○ | ○ | ○ | ○ | ○ | × | × | ○ | × |
| | HORSE | ○ | ○ | ○ | ○ | ○ | ○ | ○ | ○ | × |
| | TWO-WHEEL VEHICLE | ○ | × | × | × | ○ | ○ | ○ | ○ | ○ |
| | FOUR-WHEEL VEHICLE | ○ | ○ | ○ | × | ○ | ○ | ○ | × | × |
| | TRAIN | ○ | ○ | ○ | ○ | ○ | ○ | × | ○ | ○ |
| | AIRPLANE | ○ | ○ | ○ | × | × | ○ | × | ○ | ○ |

IMAGE PROCESSING APPARATUS, IMAGING APPARATUS, AND CONTROL METHOD FOR CONTROLLING IMAGE PROCESSING APPARATUS

BACKGROUND

Field of the Disclosure

The present disclosure relates to an image processing apparatus capable of reselecting a main object from a plurality of objects included in an image, an imaging apparatus, and a control method for controlling an image processing apparatus.

Description of the Related Art

There is a technique for changing an object as a main object among a plurality of objects included in an image that is being captured. The publication of Japanese Patent Application Laid-Open No. 2021-125735 discusses a technique for, in a case where a plurality of types of objects can be detected, switching a main object by switching the type of an object as a selection target.

In the method discussed in the publication of Japanese Patent Application Laid-Open No. 2021-125735, in a case where a plurality of objects of the same type is detected, an object intended by a user cannot be switched. Moreover, in a case where the user determines a main object as an autofocus (AF) target while reselecting the main object using an operation member, the user may reselect as the main object an object that the user is less likely to determine as a major object.

SUMMARY

The present disclosure has been made in consideration of the above situation, and provides an image processing apparatus that prevents a user from reselecting as a main object an object that the user is less likely to determine as a major object, an imaging apparatus, and a control method for controlling an image processing apparatus.

According to the present disclosure, provided is an image processing apparatus includes a memory device that stores a set of instructions, and at least one processor that executes the set of instructions to function as an acquisition unit configured to sequentially acquire images, a detection unit configured to detect a plurality of objects in the images acquired by the acquisition unit, and a main object selection unit configured to select a main object from among the plurality of objects, wherein according to whether a region of any of the plurality of objects overlaps a region of another object and a combination of a type of any of the plurality of objects and a type of the main object, the main object selection unit determines whether to permit any of the plurality of objects to be reselected as a new main object.

Further features of the present disclosure will become apparent from the following description of exemplary embodiments with reference to the attached drawings.

BRIEF DESCRIPTION OF THE DRAWINGS

FIG. 2 is a diagram illustrating a configuration of an imaging sensor according to one or more aspects of the present disclosure.

FIG. 7 is a table illustrating an example of a combination of the main object and a transition object according to one or more aspects of the present disclosure.

DESCRIPTION OF THE EMBODIMENTS

Figure 1:
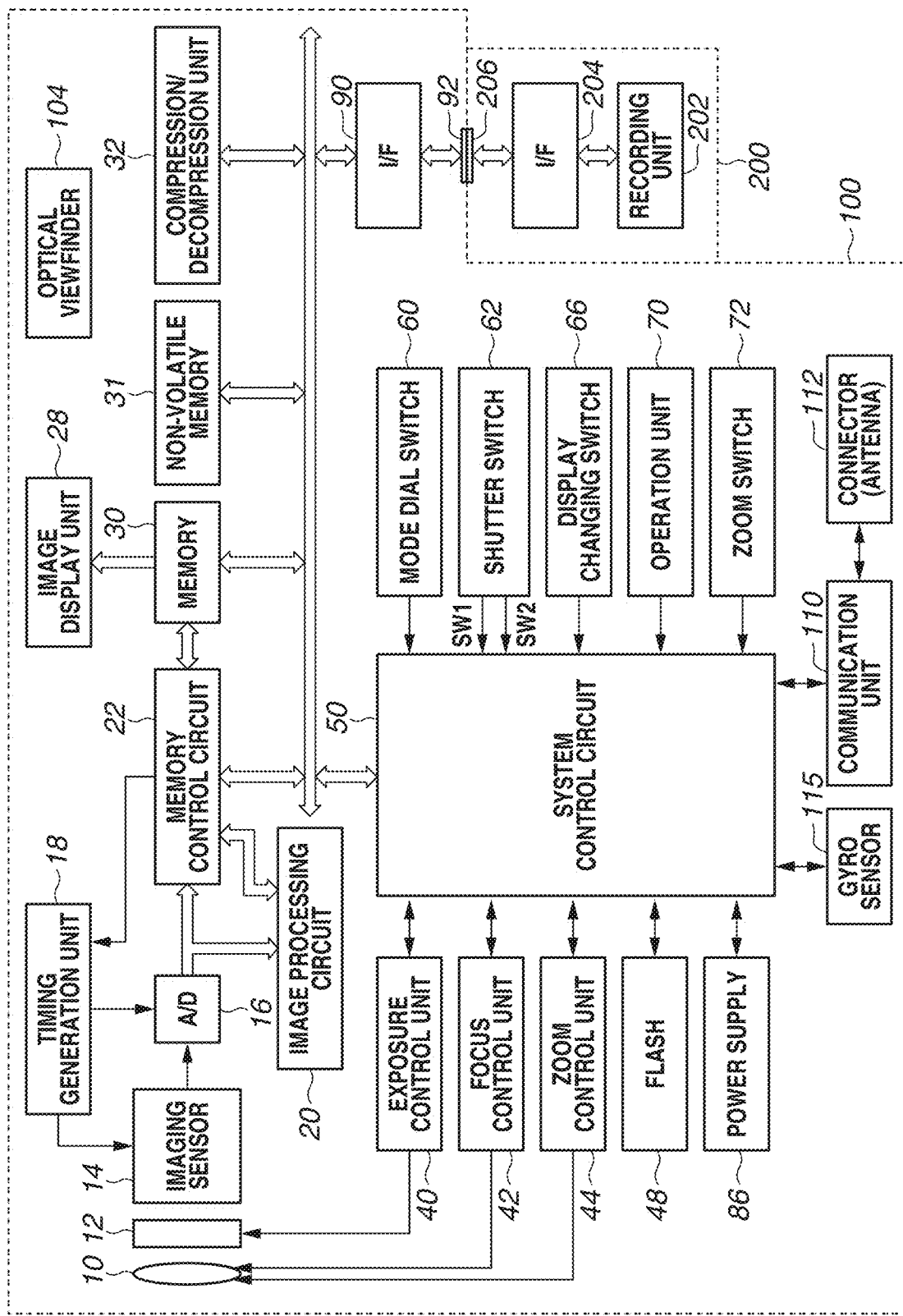
FIG. 1 is a diagram illustrating a configuration of an imaging apparatus according to one or more aspects of the present disclosure.

Hereinafter, embodiments will be described in detail with reference to the attached drawings. Note, the following embodiments are not intended to limit the scope of the claimed disclosure, and limitation is not made to an disclosure that requires a combination of all features described in the embodiments. Two or more of the multiple features described in the embodiments may be combined as appropriate. Furthermore, the same reference numerals are given to the same or similar configurations, and redundant description thereof is omitted.

In the following exemplary embodiment, a case is described where an applicable imaging apparatus performs image processing according to the present disclosure. Although the present exemplary embodiment is described taking an imaging apparatus as an example, the present disclosure is not limited to an imaging apparatus, and an image processing apparatus capable of receiving image data obtained by an imaging apparatus and performing image processing may be employed.

Examples of such an imaging apparatus or an image processing apparatus include a digital camera, a video camera, computer devices (a personal computer, a tablet computer, a media player, and a personal digital assistant (PDA)), a mobile phone, a smartphone, a game apparatus, a robot, a drone, and a driving recorder. These apparatuses are merely examples, and the present disclosure can also be carried out by another image processing apparatus.

<Configuration of Camera>

FIG. 1 is a block diagram illustrating the general functional configuration of an imaging apparatus according to the present exemplary embodiment.

In FIG. 1, an imaging apparatus 100 includes an imaging lens 10 and a mechanical shutter 12 having a diaphragm function. An imaging sensor 14 is a complementary metal-oxide-semiconductor (CMOS) sensor that converts an optical image into an electric signal. The imaging sensor 14 functions as an image acquisition unit that sequentially acquires images. An analog-to-digital (A/D) converter 16 converts an analog signal output from the imaging sensor 14 into a digital signal.

A timing generation unit (timing generation circuit) 18 supplies a clock signal and a control signal to the imaging sensor 14 and the A/D converter 16. The timing generation unit 18 is controlled by a memory control circuit 22 and a system control circuit 50. The timing generation unit 18 can control the charge accumulation time of the imaging sensor 14 by controlling the reset timing of the imaging sensor 14. Thus, the timing generation unit 18 can be used as an electronic shutter separately from the mechanical shutter 12 when a moving image is captured.

The system control circuit 50 has a central processing unit (CPU) as a computer built-in and functions as a control unit that executes various operations of the entirety of the apparatus based on computer programs stored in a non-volatile memory 31.

An image processing circuit 20 performs a pixel interpolation process for enlarging or reducing an image, a color conversion process, a noise removal process, and an edge enhancement process on data from the A/D converter 16 or data from the memory control circuit 22. The image processing circuit 20 also functions as a detection unit that detects a particular object in an image.

The image processing circuit 20 also has a face detection function for detecting a face region of a person or an animal by image recognition, an organ detection function for detecting an organ (a part) such as the pupils, the nose, or the mouth in a face, and an entire body detection function for detecting the entire body of an object (the entirety of a physical body). Then, based on the result of face detection, organ detection, or entire body detection, the image processing circuit 20 performs the process of calculating the position of the face, the organ, or the entire body.

In the face detection or the entire body detection performed by the image processing circuit 20, the shape of a contour portion of the face or the entire body is saved as feature data within the image processing circuit 20, and an image region that matches the feature data (a template) is specified by a pattern matching process in a detected image. In the face detection, an image region that matches the feature data representing the shape of the face saved in advance within the image processing circuit 20 is specified by the pattern matching process in a region obtained by the entire body detection.

The degrees of coincidence between image regions and the feature data saved within the image processing circuit 20 are calculated, and a region having a degree of coincidence greater than or equal to a predetermined threshold is set as the region of the face or the entire body.

To increase opportunities to detect the face or the entire body and improve detection accuracy, the pattern matching process is performed using a plurality of pieces of feature data saved within the image processing circuit 20.

Alternatively, the pattern matching process may be performed using feature data of only a part of the shape of the face or the entire body. Yet alternatively, to detect the face or the entire body regardless of the size of the face or the entire body, the pattern matching process may be performed by changing the size of the feature data.

In the organ detection, an image region that matches feature data (a template) representing the shape of the organ and saved in advance within the image processing circuit 20 is specified by the pattern matching process in a region obtained by the face detection. The degree of matching between the organ and the feature data is calculated, thereby calculating the reliability of the organ.

As another detection method, detection using deep learning can also be performed. The image processing circuit 20 includes a plurality of sum-of-products calculators and is also used as a processor that performs a deep learning process.

The image processing circuit 20 applies an object detection process to image data using a single learning model selected by the system control circuit 50 among a plurality of learning models stored in the non-volatile memory 31.

The image processing circuit 20 may also perform a plurality of detection processes on a single piece of image data by switching learning models stored in the non-volatile memory 31.

For example, the non-volatile memory 31 stores three learning models, namely a learning model capable of detecting parts such as the pupils, the faces, or the entire bodies of a dog and a cat, a learning model capable of detecting a part such as the pupils, the face, or the entire body of a bird, and a learning model capable of detecting a vehicle such as a train or a car.

Using one of the three learning models, the system control circuit 50 performs a detection process on an image based on the learning model in the image processing circuit 20.

The system control circuit 50 performs detection three times in a single image using the three learning models, whereby it is possible to detect parts such as the pupils, the faces, or the entire bodies of a dog and a cat, a part such as the pupils, the face, or the entire body of a bird, and a vehicle such as a train or a car.

Although parts such as the pupils, the faces, or the entire bodies of a dog and a cat, a part such as the pupils, the face, or the entire body of a bird, and a vehicle such as a train or a car are detected in the present exemplary embodiment, a particular object to be detected is not limited to these.

Alternatively, another method other than the methods illustrated in the present exemplary embodiment may be used so long as a particular object can be detected.

The image processing circuit 20 also performs a tracking process on images such as images during live view. If the image processing circuit 20 detects an object, the image processing circuit 20 temporarily stores the detected object as a template for the detected object in a memory 30.

Based on the information regarding the template temporarily stored in the memory 30, the image processing circuit 20 also searches for a region that coincides with the template in an image generated at a next timing. Then, the image processing circuit 20 performs the tracking process on the region that coincides with the template as an object region.

In the tracking process, as a method for the image processing circuit 20 to search for a region that coincides with the template, there is a method for clipping the image region by region, taking the absolute values of the differences between the regions and the template, and setting a region that differs little from the template as an object region. Although there is also a method for obtaining a region that coincides with the template based on the degree of coincidence between the template and a histogram or color data, another method may be employed so long as a region that coincides with the template temporarily stored in the memory 30 can be specified in the image.

As described above, in the present exemplary embodiment, the image processing circuit 20 functions as a tracking unit that tracks (at least a single part of) a particular object detected in an image by comparing images over a plurality of images sequentially acquired by the image acquisition unit.

The tracking unit may be configured including the system control circuit 50. Based on an object region corresponding to (a part of) a particular object detected by the detection unit, the tracking unit tracks (the part of) the particular object.

In a case where a plurality of objects is detected, the system control circuit 50 determines a main object based on an object selected by a user or the size or the position in the screen of an object and sets the region of the main object as a focus detection region.

If the detection unit ceases to detect (the part of) the particular object, the tracking unit continues to track (the part of) the particular object by referencing an object region in an image in which (the part of) the particular object is detected.

In a case where an object detected during live view ceases to be detected, the system control circuit 50 switches to an object tracking process using the image processing circuit 20 and sets an object region obtained by the object tracking process as a focus detection region. The object tracking process is performed, whereby it is possible to perform focus detection on a part of the same object longer and continue to focus on the object.

If the part of the same object can be detected within a tracking continuation time, the system control circuit 50 executes the focus detection process. If the part of the same object ceases to be tracked, the system control circuit 50 sets another part of the same object or an object of another type as the main object (the focus detection region).

Figure 3:
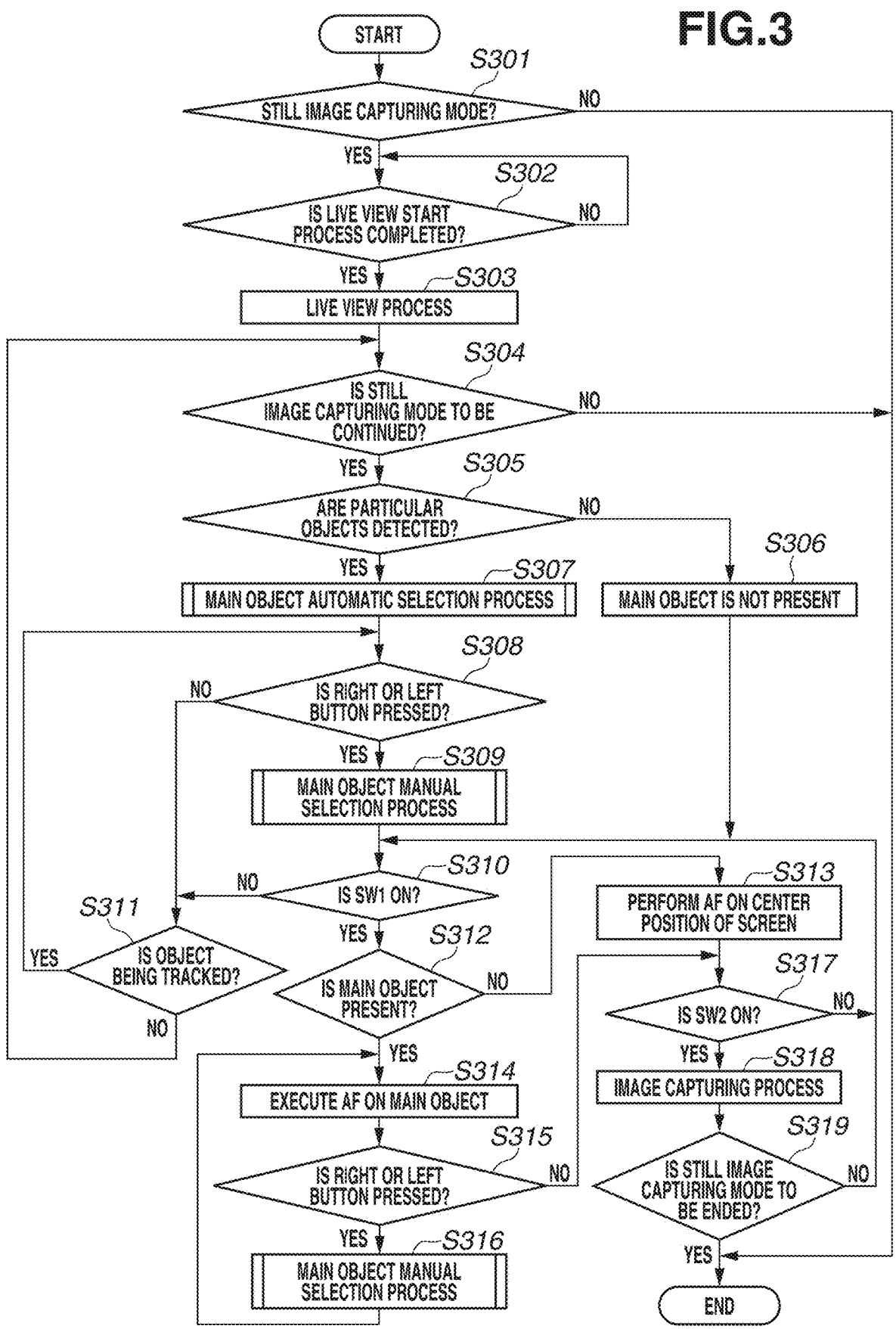
FIG. 3 is a flowchart illustrating an example of a flow where still image capturing is performed by the imaging apparatus according to one or more aspects of the present disclosure.
Figure 4:
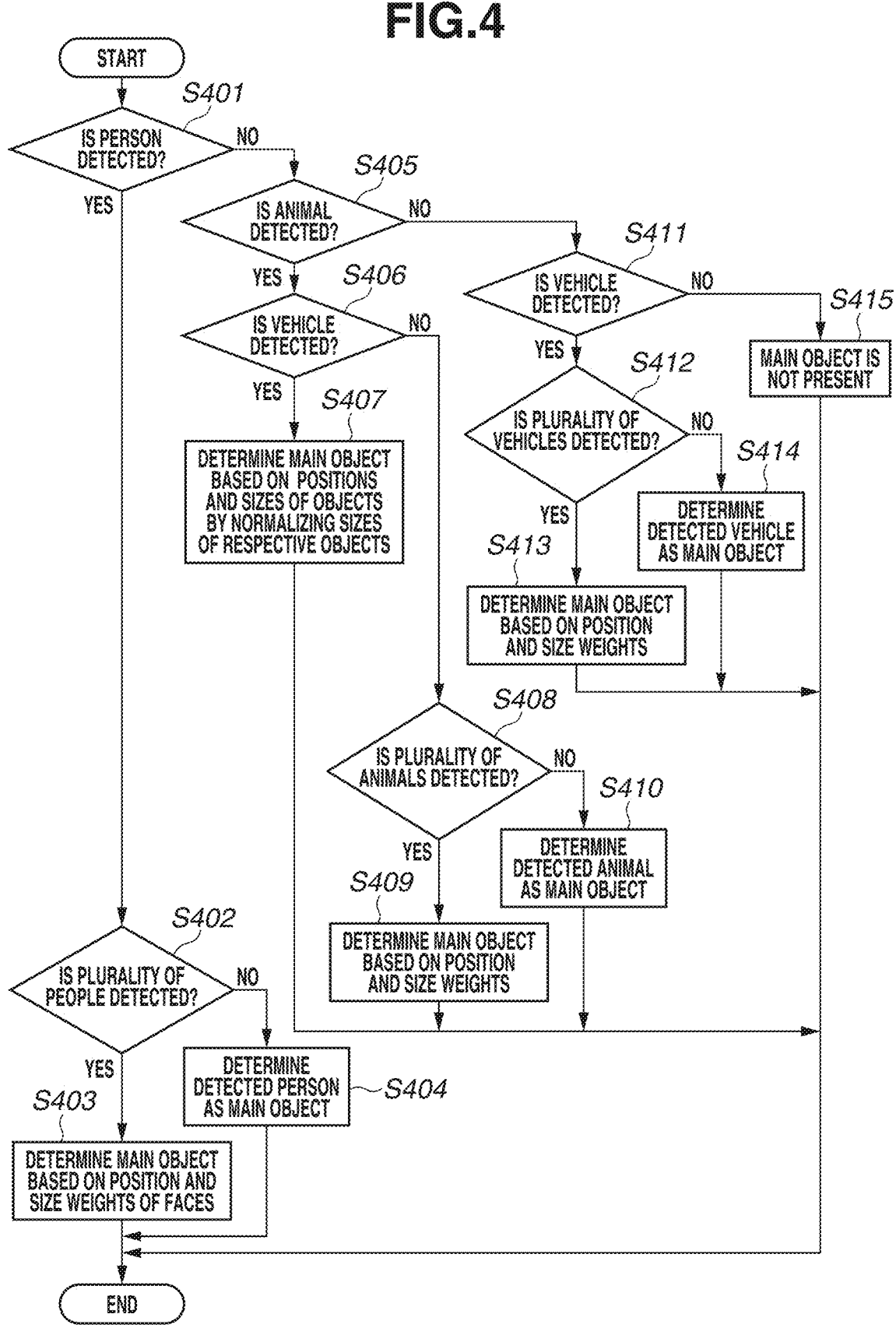
FIG. 4 is a flowchart illustrating a method for determining a main object according to one or more aspects of the present disclosure.

That is, if the time in which the tracking unit continues to track the part of the same object exceeds a tracking continuation period illustrated in FIG. 3, the system control circuit 50 sets the focus detection region by determining another part of the same object or an object of a different type as the main object as illustrated in FIG. 4.

Additionally, the image processing circuit 20 performs a predetermined calculation process using image data captured to perform an auto white balance (hereinafter, "AWB") process. The image processing circuit 20 also calculates the obtained calculation result as a white balance (hereinafter, "WB") evaluation value. Based on the calculated WB evaluation value, the image processing circuit 20 also converts the colors of the image data.

Further, the image processing circuit 20 performs a predetermined calculation process using image data captured to calculate an automatic exposure control (hereinafter, "AE") evaluation value and a flash exposure control (hereinafter, "EF") evaluation value to perform an AE process and an EF process, respectively.

Based on the obtained AE evaluation value and EF evaluation value, the system control circuit 50 controls an exposure control unit 40 and a flash 48 according to a predetermined algorithm.

The memory control circuit 22 controls the A/D converter 16, the timing generation circuit 18, the image processing circuit 20, the memory 30, and a compression/decompression unit 32.

Data in the A/D converter 16 is written to the memory 30 via the image processing circuit 20 and the memory control circuit 22, or data in the A/D converter 16 is written to the memory 30 directly via the memory control circuit 22.

Based on control of the memory control circuit 22, an image display unit 28 displays image data for display written in the memory 30. It is possible to achieve a live view function by sequentially displaying captured pieces of image data using the image display unit 28.

The display of the image display unit 28 can be turned on or off according to an instruction from the system control circuit 50. If the display is turned off, it is possible to significantly reduce the power consumption of the imaging apparatus 100.

The memory 30 is a memory that temporarily stores a captured still image or moving image. The memory 30 has a sufficient storage capacity for storing a predetermined number of still images or a moving image of a predetermined length of time. Consequently, also in the case of continuous image capturing for continuously capturing a plurality of still images, it is possible to write a large number of images at high speed to the memory 30. The memory 30 can also be used as a region that temporarily stores feature data for authentication or a work area for the system control circuit 50.

The non-volatile memory 31 is composed of a flash read-only memory (ROM). Program codes to be executed by the system control circuit 50 are written in the non-volatile memory 31, and the system control circuit 50 executes various processes while sequentially reading the program codes. In the non-volatile memory 31, a region that stores feature data of a face for authentication as dictionary data, a region that stores system information, and a region that stores user setting information are provided so that the non-volatile memory 31 can read and restore various pieces of information and settings when the non-volatile memory 31 starts next time.

The compression/decompression unit 32 compresses and decompresses image data by adaptive discrete cosine transform (ADCT). The compression/decompression unit 32 reads an image stored in the memory 30, performs a compression process or a decompression process on the image, and writes data obtained by the process to the memory 30 again.

The exposure control unit 40 controls the mechanical shutter 12 having the diaphragm function. The exposure control unit 40 can also execute a flash light adjustment function using the flash 48.

A focus control unit 42 controls the focusing of the imaging lens 10. A zoom control unit 44 controls the zooming of the imaging lens 10. The flash 48 has a flash light adjustment function.

Based on the calculation results of the image processing circuit 20 calculating captured image data, the system control circuit 50 controls the exposure control unit 40 and the focus control unit 42.

The system control circuit 50 also performs an autofocus (hereinafter, "AF") process based on pixel data for phase difference detection obtained from the imaging sensor 14. "AF" refers to automatic focus detection for setting a main object region selected by the user or a main object region automatically set by the camera as a focus detection region and automatically detecting a focal position.

The imaging sensor 14 is composed of a CMOS sensor and peripheral circuits of the CMOS sensor. In the imaging sensor 14, a single photoelectric conversion element is placed on each of m light-receiving pixels in the horizontal direction and n light-receiving pixels in the vertical direction. The imaging sensor 14 is configured to enable independent outputs from all the pixels. Some of all the pixels are focus detection pixels, and it is possible to perform AF using an imaging plane phase difference detection method (imaging plane phase difference AF).

A plurality of focus detection pixels 251 is each configured to receive a light beam passing through one of a pair of different regions of the exit pupil of an imaging optical system.

Although the present exemplary embodiment is described on the assumption that in the imaging sensor 14, some of all the pixels are focus detection pixels, a configuration may be employed in which two-dimensionally arranged pixels include a plurality of photoelectric conversion elements for a single microlens.

Imaging pixels 250 each receive a light beam passing through the entire region of the exit pupil of the imaging optical system that forms an image of an object, thereby generating the image of the object.

On the front surface of the imaging pixels 250, for example, color filters in the Bayer arrangement are placed.

In the example of FIG. 2, in the imaging sensor 14, among pixels in 2 rows×2 columns belonging to the first and second rows, a pair of G pixels (a Gr pixel and a Gb pixel) placed at opposing corners is configured as imaging pixels, and a B pixel is replaced with a focus detection pixel 251. Pixels in 2 rows×2 columns belonging to the fifth and sixth rows are also similarly configured.

The imaging sensor 14 includes a plurality of imaging pixels 250, each of which receives a light beam passing through the entire region of the exit pupil of an imaging optical system that forms an image of an object, thereby generating the image of the object. The imaging sensor 14 further includes a plurality of focus detection pixels 251, each of which receives a light beam passing through one of different regions of the exit pupil of the imaging optical system. As a whole, the plurality of focus detection pixels 251 can receive a light beam passing through the entire region of the exit pupil of the imaging optical system. For example, in the imaging sensor 14, among pixels in 2 rows×2 columns, a pair of G pixels placed at opposing corners is left as imaging pixels, and an R pixel and a B pixel are replaced with focus detection pixels 251.

The system control circuit 50 performs a focus detection process using the phase difference AF method based on imaging signals of the focus detection pixels 251 discretely placed in the imaging sensor 14. That is, based on a light beam passing through a pair of pupil regions of the imaging optical system, a pair of image signals is formed by the plurality of focus detection pixels 251. For example, a group of focus detection pixels 251 in the second row in FIG. 2 forms a right-eye image signal, and a group of focus detection pixels 251 in the sixth row in FIG. 2 forms a left-eye image signal. Then, the pair of image signals is subjected to correlation calculation, thereby acquiring the amount of shift in this pair of images. Since the amount of shift changes according to the distance to the object, focus detection is performed based on the amount of shift.

Although the imaging plane phase difference AF is achieved by replacing a part of the imaging pixel array placed on the imaging plane with the focus detection pixels 251 in the present exemplary embodiment, the present disclosure is not limited to this method, and any configuration may be employed in which focus detection can be performed. For example, phase difference focus detection using a known sensor dedicated to focus detection or known contrast focus detection may be employed.

Operating units 60, 62, 66, 70, and 72 are used to input various operation instructions to the system control circuit 50 and are composed of one or more combinations of a switch, a dial, a touch panel, pointing using line-of-sight detection, and a speech recognition device.

The mode dial switch 60 can switch and set function modes such as powering off, an automatic image capturing mode, an image capturing mode, a panoramic image capturing mode, a moving image capturing mode, a reproduction mode, and a personal computer (PC) connection mode.

The shutter switch 62 is a 2-stroke (SW1 and SW2) operation member. If the shutter switch 62 is pushed in halfway, the shutter switch SW1 is turned on, and the operations of an autofocus (AF) process, an automatic exposure (AE) process, and an auto white balance (AWB) process are started. That is, the user can give an image capturing preparation instruction through the shutter switch 62.

If the shutter switch 62 is fully pushed in, the shutter switch SW2 is turned on, and an image capturing process is started. Then, in the case of flash image capturing, after a pre-flash process for EF is performed, the mechanical shutter 12 is caused to operate to expose the imaging sensor 14 for an exposure time determined in the AE process.

The flash 48 is caused to emit light during this exposure period, and the exposure control unit 40 causes the mechanical shutter 12 to block light according to the end of the exposure period, thereby ending the exposure of the imaging sensor 14.

A signal read from the imaging sensor 14 is written as image data to the memory 30 via the A/D converter 16 and the memory control circuit 22, and a development process using the calculation of the image processing circuit 20 and the memory control circuit 22 is performed. The image data is read from the memory 30 and compressed by the compression/decompression unit 32.

Then, a recording process for writing the image data to a recording medium 200 is performed, and this series of operations of still image capturing and the recording process is performed by turning on the shutter switch SW2.

The display changing switch 66 can switch the display (switch the on and off states) of the image display unit 28. With this function, when an image is captured using an optical viewfinder 104, it is possible to save power by turning off the image display unit 28 composed of a liquid crystal display (LCD).

The operation unit 70 is composed of various buttons, a touch panel, and a rotating dial and includes a menu button, a set button, a macro button, a multi-screen reproduction page break button, a flash setting button, and a single image capturing/continuous image capturing/self-timer switching button.

The operation unit 70 also includes a menu movement+(plus) button, a menu movement−(minus) button, a reproduction image movement+(plus) button, a reproduction image movement−(minus) button, an image capturing image quality selection button, an exposure compensation button, and a date/time setting button.

The zoom switch 72 functions as a zoom operation unit for the user to give an instruction to change the magnification of a captured image. The zoom switch 72 includes a tele switch for changing the imaging angle of view to the telephoto side, and a wide switch for changing the imaging angle of view to the wide-angle side. The use of the zoom switch 72 triggers the giving of an instruction to change the imaging angle of view of the imaging lens 10 to the zoom control unit 44, and the execution of an optical zoom operation. The use of the zoom switch 72 also triggers the clipping of an image by the image processing circuit 20, and an electronic change in the zooming of the imaging angle of view in the pixel interpolation process.

A power supply unit 86 is composed of a primary battery such as an alkaline battery, a secondary battery such as a lithium-ion (Li-ion) battery, or an alternating current (AC) adapter.

An interface 90 is an interface with the recording medium 200 such as a memory card or a hard disk. A connector 92 is a connector for electrically connecting to the recording medium 200 such as a memory card or a hard disk.

The optical viewfinder 104 is provided separately from the image display unit 28, and an image can be captured using the optical viewfinder 104 alone.

A communication unit 110 has various communication functions based on Universal Serial Bus (USB), the Institute of Electrical and Electronics Engineers (IEEE) 1394, a local area network (LAN), and wireless communication, and may also have a Global Positioning System (GPS) receiver built-in. The communication unit 110 can receive various radio waves via a connector (antenna) 112.

A gyro sensor 115 is an angular velocity detection device. The gyro sensor 115 detects a change in an angle per unit time, whereby the system control circuit 50 calculates the amount of movement in a yawing direction or the amount of movement in a pitching direction based on an angular velocity.

The recording medium 200 includes a recording unit 202 composed of a semiconductor memory or a magnetic disk, an interface 204 with the imaging apparatus 100, and a connector 206 for electrically connecting to the imaging apparatus 100.

In a case where the user determines a main object as an AF target while reselecting the main object using the operation unit 70 in the above configuration, the user may reselect as the main object an object that the user is less likely to determine as a major object, such as an object other than an actual object or an erroneously detected object.

In the present exemplary embodiment, to prevent such reselection, according to whether an object to be reselected overlaps another object and the combination of the object types of the object to be reselected and a main object, it is determined whether to reselect the object as the main object.

<Still Image Capturing Flow>

Next, with reference to FIG. 3, a description is given of an example of a flow where still image capturing is performed by the imaging apparatus 100. Steps in this flowchart are executed by the system control circuit 50 or the components of the imaging apparatus 100 according to an instruction from the system control circuit 50.

In FIG. 3, the detection of objects and the determinations of a main object and an AF target are performed during live view in a still image capturing mode.

In step S301, the system control circuit 50 determines whether the still image capturing mode is set. If it is determined in step S301 that the still image capturing mode is set (Yes in step S301), the processing proceeds to step S302. If it is not determined in step S301 that the still image capturing mode is set (No in step S301), the still image capturing flow ends. After the still image capturing flow, the system control circuit 50 controls the imaging apparatus 100 according to the camera setting such as the reproduction mode or the powering off.

In step S302, the system control circuit 50 determines whether a live view start process is completed in the imaging apparatus 100. The live view start process is the process in which the timing generation circuit 18 supplies a clock signal and a control signal for live view to the imaging sensor 14 and the A/D converter 16. If it is determined in step S302 that the live view start process is completed (Yes in step S302), the processing proceeds to step S303. If it is determined that the live view start process is not completed (No in step S302), the system control circuit 50 waits in step S302.

In step S303, a live view process is started, and the processing proceeds to step S304. The live view process is the process of temporarily storing image data generated using the image processing circuit 20 from data captured by the imaging sensor 14 in the memory 30 and displaying the image data on the image display unit 28. This process is continuously executed according to the timing of the timing generation circuit 18, whereby the user can confirm an image captured in real time.

In step S304, the system control circuit 50 determines whether to continue the still image capturing mode. If it is not determined in step S304 that the still image capturing mode is to be continued (No in step S304), the flow ends. The determination of whether to continue the still image capturing mode is made according to the setting of the imaging apparatus 100. If the camera setting is set to the image capturing mode, it is determined that the still image capturing mode is to be continued.

If, on the other hand, it is determined in step S304 that the still image capturing mode is to be continued (Yes in step S304), the processing proceeds to step S305.

In step S305, the image processing circuit 20 performs an object detection process on the image data and determines whether particular objects are detected.

If it is determined in step S305 that objects are not detected (No in step S305), the processing proceeds to step S306. In step S306, it is determined that a main object is not present, and the processing proceeds to step S310.

If it is determined in step S305 that objects are detected (Yes in step S305), the processing proceeds to step S307.

In step S307, the system control circuit 50 performs a main object automatic selection process for determining the main object from among the detected objects, and the processing proceeds to step S308. An example of the main object automatic selection process will be described below.

In step S308, the system control circuit 50 determines whether a right button or a left button of the operation unit 70 is pressed. If it is determined in step S308 that the right button or the left button of the operation unit 70 is pressed (Yes in step S308), the processing proceeds to step S309.

In step S309, the system control circuit 50 performs a main object manual selection process for selecting the main object again according to the direction of the button specified in step S308, and the processing proceeds to step S310. An example of the main object manual selection process will be described below.

In step S310, the system control circuit 50 determines whether the shutter switch SW1 of the shutter switch 62 is in the on state. If it is determined in step S310 that the shutter switch SW1 of the shutter switch 62 is not in the on state (No in step S310), the processing proceeds to step S311.

In step S311, the system control circuit 50 determines whether the image processing circuit 20 is tracking an object. If it is determined in step S311 that an object is being tracked (Yes in step S311), the processing returns to step S308. If it is not determined in step S311 that an object is being tracked (No in step S311), the processing returns to step S304.

If the system control circuit 50 determines in step S310 that the shutter switch SW1 of the shutter switch 62 is in the on state (Yes in step S310), the processing proceeds to step S312.

In step S312, the system control circuit 50 determines whether the main object is present.

If it is not determined that the main object is present (No in step S312), the processing proceeds to step S313.

In step S313, the system control circuit 50 controls the components of the imaging apparatus 100 to perform an AF process on the center position of the screen (the center position of the image displayed in live view). A region on which the AF process is performed is not limited to the center of the screen. For example, the AF process may be performed on a region determined as the closest region to the imaging sensor 14 in the depth direction in the screen. Alternatively, the image processing circuit 20 may determine a remarkable region using color information and luminance information in the screen, and based on the result of the determination, set the position where the AF process is performed. If the AF process is completed in step S313, the processing proceeds to step S317.

If it is determined in step S312 that the main object is present (Yes in step S312), the processing proceeds to step S314.

In step S314, the AF process is executed on a region corresponding to the main object, and the processing proceeds to step S315.

In step S315, the system control circuit 50 determines whether the right button or the left button of the operation unit 70 is pressed. If it is determined that the right button or the left button of the operation unit 70 is pressed (Yes in step S315), the processing proceeds to step S316.

In step S316, the system control circuit 50 performs the main object manual selection process for selecting the main object again according to the direction specified using the right button or the left button, and the processing returns to step S314.

If it is not determined in step S315 that the right button or the left button of the operation unit 70 is pressed (No in step S315), the processing proceeds to step S317.

In step S317, the system control circuit 50 determines whether the shutter switch SW2 of the shutter switch 62 is in the on state. If it is not determined that the shutter switch SW2 of the shutter switch 62 is in the on state (No in step S317), the processing returns to step S310.

If it is determined in step S317 that the shutter switch SW2 of the shutter switch 62 is in the on state (Yes in step S317), the processing proceeds to step S318.

In step S318, under control of the system control circuit 50, the components of the imaging apparatus 100 perform a still image capturing process, and the processing proceeds to step S319.

In step S319, the system control circuit 50 determines whether to end the still image capturing mode. The determination of whether to end the still image capturing mode is made according to the camera setting. If a setting other than the image capturing mode, such as the powering off or the reproduction mode, is set, the still image capturing mode is to be ended.

If it is not determined in step S319 that the still image capturing mode is to be ended (No in step S319), the processing returns to step S310. If it is determined in step S319 that the still image capturing mode is to be ended (Yes in step S319), the flow ends.

<Main Object Automatic Selection Process>

Next, with reference to FIG. 4, the details of the main object automatic selection process in step S307 in FIG. 3 are described. The main object automatic selection process is the process of determining the main object as the AF target from the objects detected as the result of performing the object detection in the screen.

In step S401, the image processing circuit 20 determines whether a person is detected in the screen as the result of the object detection process. If it is determined in step S401 that a person is detected in the screen (Yes in step S401), the processing proceeds to step S402.

In step S402, the image processing circuit 20 determines whether a plurality of people is detected in the screen. If it is determined in step S402 that a plurality of people is detected in the screen (Yes in step S402), the processing proceeds to step S403.

In step S403, based on the position and size weights of the faces of the people, the system control circuit 50 determines a person object as the main object. The position and size weights for determining a person object as the main object are obtained by multiplying the position and the size of the face of each of the people by coefficients for the position weight and the size weight set by the system control circuit 50. Based on the evaluation values of the position weight and the size weight of each of the people, the system control circuit 50 determines an object having the greatest evaluation values as the main object. For the position weight, for example, a coefficient is provided so that the closer to the center of an AF frame the center position of the face of the person is, the greater the weight is. For the size weight, a coefficient is provided so that the greater the size of the face of the object is, the greater the weight is.

Although a person object as the main object is determined using the position weights and the size weights in step S403, the main object may be determined using another criterion. For example, a coefficient may be provided so that the closer to the front the direction of the face of the person is, the greater the weight is.

If a person object as the main object is determined based on the position and size weights of the faces of the people in step S403, this flow ends.

If it is not determined in step S402 that a plurality of people is detected in the screen (i.e., this means that only a single person is detected) (No in step S402), the processing proceeds to step S404.

In step S404, the detected person is determined as the main object, and this flow ends.

If it is not determined in step S401 that a person is detected in the screen (No in step S401), the processing proceeds to step S405.

In step S405, the image processing circuit 20 determines whether an animal such as a dog or a cat is detected in the screen. If it is determined in step S405 that an animal is detected in the screen (Yes in step S405), the processing proceeds to step S406.

In step S406, the image processing circuit 20 determines whether a vehicle such as an automobile is detected in the screen. If it is determined in step S406 that a vehicle is detected in the screen (Yes in step S406), the processing proceeds to step S407.

In step S407, based on the positions and the sizes of the objects using sizes normalized according to object types, the system control circuit 50 obtains the main object in the AF frame. For example, the sizes are normalized so that, when objects such as a dog, a cat, and an automobile are at an equal distance from the imaging sensor 14, the object regions have the same area. An object as the main object is determined using the position weights and the normalized size weights.

If it is not determined in step S406 that a vehicle such as an automobile is detected in the screen (No in step S406), the processing proceeds to step S408.

In step S408, the image processing circuit 20 determines whether a plurality of animals is detected in the screen. If it is determined in step S408 that a plurality of animals is detected (Yes in step S408), the processing proceeds to step S409.

In step S409, based on the position and size weights of the animal objects, the system control circuit 50 determines an animal object as the main object from among the animal objects in the screen, and the flow ends.

If it is not determined in step S408 that a plurality of animals is detected (No in step S408), the processing proceeds to step S410.

In step S410, the animal object detected in the screen is determined as the main object, and the flow ends.

If it is not determined in step S405 that an animal is detected in the screen (No in step S405), the processing proceeds to step S411.

In step S411, the image processing circuit 20 determines whether a vehicle object such as an automobile is detected in the screen. If it is determined in step S411 that a vehicle object is detected (Yes in step S411), the processing proceeds to step S412.

In step S412, the image processing circuit 20 determines whether a plurality of vehicles is detected in the screen. If it is determined in step S412 that a plurality of vehicles is detected (Yes in step S412), the processing proceeds to step S413.

In step S413, based on the position and size weights of the vehicle objects, the system control circuit 50 determines a vehicle object as the main object from among the vehicle objects in the screen, and the flow ends.

If it is not determined in step S412 that a plurality of vehicles is detected in the screen (No in step S412), the processing proceeds to step S414.

In step S414, the vehicle object detected in the screen is determined as the main object, and the flow ends.

If it is not determined in step S411 that a vehicle object such as an automobile is detected in the screen (No in step S411), it is determined that the main object is not present, and the flow ends.

<Main Object Manual Selection Process>

Figure 5:
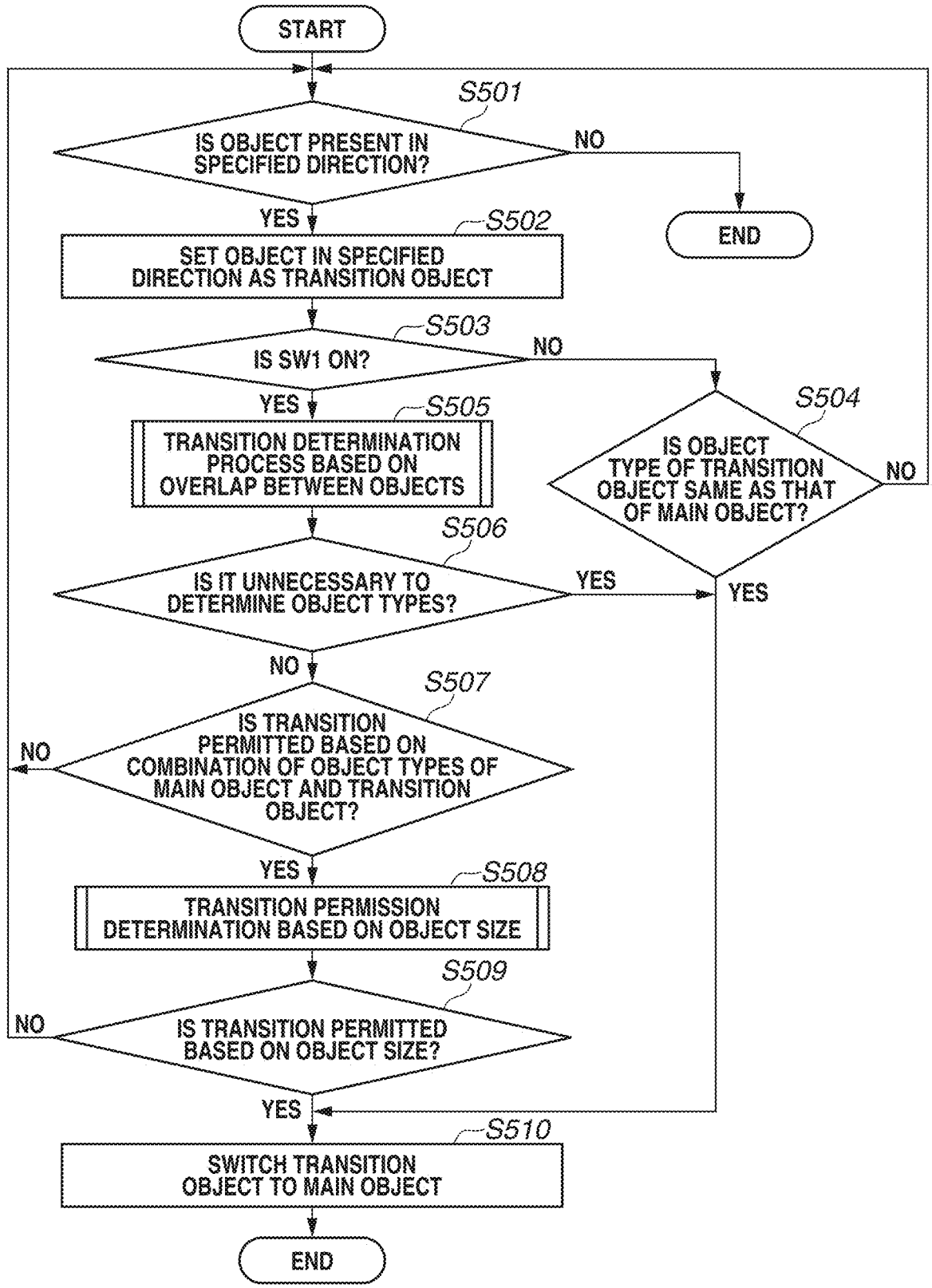
FIG. 5 is a flowchart illustrating a main object manual selection process according to one or more aspects of the present disclosure.

FIG. 5 illustrates the main object manual selection process. The main object manual selection process is the process of selecting an object present in the direction indicated by the user in the screen as the main object (selecting the main object) again.

Figure 9:
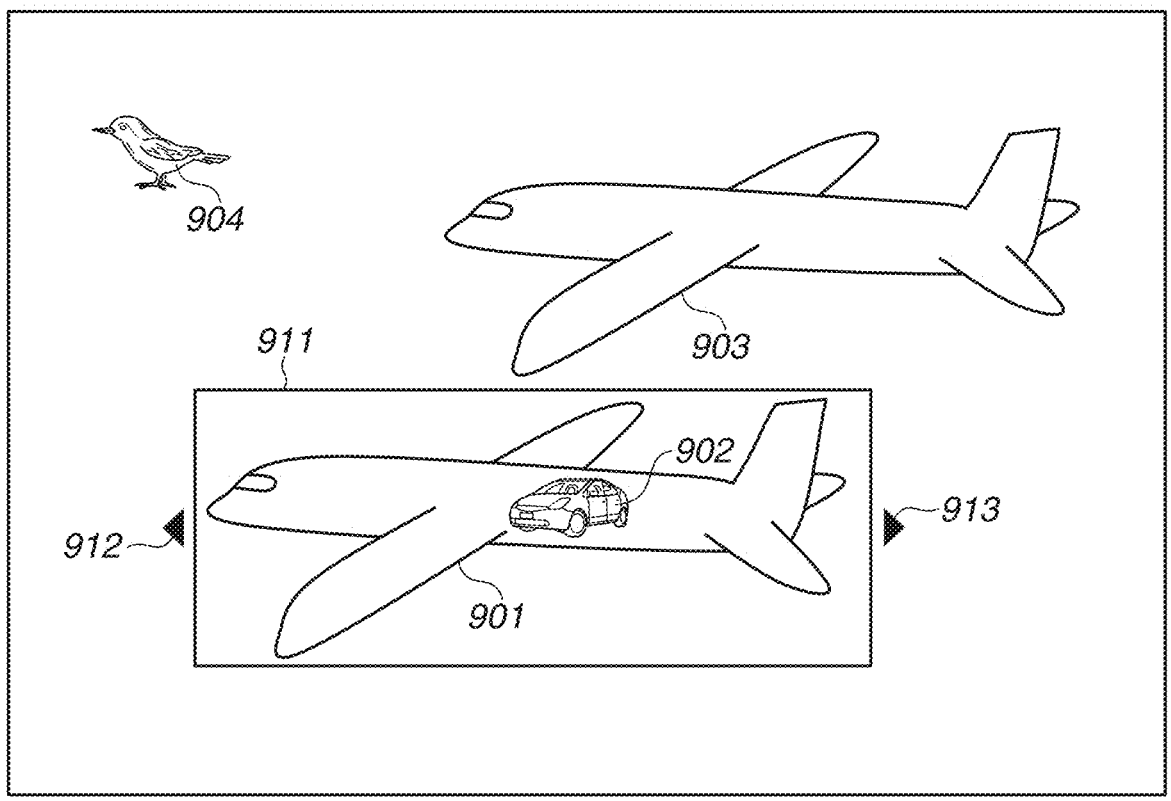
FIG. 9 is a diagram illustrating an example of display illustrating a position of the main object according to one or more aspects of the present disclosure.

In step S501, it is determined whether an object is present in the direction specified by the user in the screen relative to the main object. With reference to FIG. 9, which is an example of image capturing, a description is given of an example of the determination of whether an object is present in the direction specified by the user.

FIG. 9 is an example of display of an image for describing the main object manual selection process. An object 901 is an airplane as the main object. An object 902 is a detected four-wheel vehicle. An object 903 is a detected airplane. An object 904 is a detected bird.

Frame display 911 indicates that the airplane 901 is the main object. Display 912 and 913 indicates that the main object can be switched using the right button or the left button of the operation unit 70.

The determination of which of the left and right an object is present on is made based on the center coordinates of the object region. In FIG. 9, an object adjacent to the left of the object 901 is the object 904, and an object adjacent to the right of the object 901 is the object 902.

First, if it is not determined in step S501 that an object is present in the direction specified by the user (No in step S501), this flow ends.

If it is determined in step S501 that an object is present in the direction specified by the user (Yes in step S501), the processing proceeds to step S502.

In step S502, the object adjacent to the main object in the direction specified by the user is set as a transition object, and the processing proceeds to step S503.

In step S503, it is determined whether the shutter switch SW1 of the shutter switch 62 is in the on state (an autofocus instruction is being given). If it is not determined that the shutter switch SW1 of the shutter switch 62 is in the on state (No in step S503), the processing proceeds to step S504.

In step S504, it is determined whether the object type of the transition object is the same as that of the main object. The object types may be classifications such as a person, an animal, and a vehicle, or may be classifications such as a person, a dog, a cat, a horse, a two-wheel vehicle, a four-wheel vehicle, an airplane, and a train.

If it is determined in step S504 that the object type of the transition object is the same as that of the main object (the transition object and the main object are both people, animals, or vehicles) (Yes in step S504), the processing proceeds to step S510.

If it is not determined in step S504 that the object type of the transition object is the same as that of the main object (No in step S504), the processing returns to step S501.

If it is determined in step S503 that the shutter switch SW1 of the shutter switch 62 is in the on state (Yes in step S503), the processing proceeds to step S505.

In step S505, a transition determination process based on the overlap between the objects is performed, and the processing proceeds to step S506. The transition determination process based on the overlap between the objects is the process of determining whether it is unnecessary to determine the object types to set the transition object as the main object. A specific example will be described below.

If it is determined in step S506 that it is unnecessary to determine the object types to set the transition object as the main object (Yes in step S506), the processing proceeds to step S510.

If it is not determined in step S506 that it is unnecessary to determine the object types to set the transition object as the main object (No in step S506), the processing proceeds to step S507.

In step S507, based on the combination of the object types of the main object and the transition object, it is determined whether to permit transition to the transition object.

With reference to FIG. 7, a description is given of an example of the determination of whether to permit transition to the transition object according to the combination of the object types of the main object and the transition object. FIG. 7 is an index indicating the object type of the main object along the vertical axis and indicating the object type of the transition object along the horizontal axis. If the overlapping portion of the combination of objects indicates "○", transition is permitted (it is determined that transition is permitted). If the overlapping portion of the combination of objects indicates "×", transition is prohibited (it is determined that transition is prohibited).

For example, if the main object is an airplane and the transition object is a four-wheel vehicle as in the relationship between the objects 901 and 902 in FIG. 9, transition is prohibited. If the main object is a person and the transition object is a four-wheel vehicle, transition is permitted.

If it is not determined in step S507 that transition is permitted based on the combination of the object types of the main object and the transition object (No in step S507), the processing returns to step S501.

If it is determined in step S507 that transition is permitted based on the combination of the object types of the main object and the transition object (Yes in step S507), the processing proceeds to step S508.

In step S508, a transition permission determination based on the object size is made, and the processing proceeds to step S509. The transition permission determination based on the object size is the process of determining whether to permit transition according to the size of the transition object. A specific example will be described below.

In step S509, it is determined whether transition is permitted based on the object size. If it is not determined that transition is permitted based on the object size (No in step S509), the processing returns to step S501.

If it is determined in step S509 that transition is permitted based on the object size (Yes in step S509), the processing proceeds to step S510.

In step S510, the transition object is switched to the main object, and the flow ends.

According to this flow, for example, when the object 901 in FIG. 9 is the main object in a case where the shutter switch SW1 of the shutter switch 62 is off, and if the right button is pressed, the main object is switched to the object 903.

In the example of FIG. 5, in step S502, the object 902 is determined as a transition object. In step S506, however, it is not determined that it is unnecessary to determine the object types (it is unnecessary to make the determination). In step S507, it is not determined that transition is permitted. Thus, the processing returns to step S501. Then, in step S502, the object 903 is determined as a transition object. In step S505, it is determined that it is unnecessary to determine the object types. In step S510, the main object is switched to the object 903.

When the object 901 in FIG. 9 is the main object in a case where the shutter switch SW1 of the shutter switch 62 is off, and if the left button is pressed, the main object is switched to the object 904.

In the example of FIG. 5, in step S502, the object 904 is determined as a transition object. In step S505, it is determined that it is unnecessary to determine the object types. In step S510, the main object is switched to the object 904.

When the object 901 in FIG. 9 is the main object in a case where the shutter switch SW1 of the shutter switch 62 is on, the main object can be switched to only the object 903, no matter which of the right button and the left button is pressed.

In the example of FIG. 5, if the right button is pressed, then in step S502, the object 902 is determined as a transition object. In step S504, however, based on the determination of whether the object type of the transition object is the same as that of the main object, the processing returns to step S501. Then, in step S502, the object 903 is set as a transition object. Then, in step S504, it is determined that the object type of the transition object is the same as that of the main object. In step S510, the main object is switched to the object 903.

If the left button is pressed, then in step S502, the object 904 is determined as a transition object. In step S504, however, based on the determination of whether the object type of the transition object is the same as that of the main object, the processing returns to step S501. Then, in step S502, the object 903 is set as a transition object. Then, in step S504, it is determined that the object type of the transition object is the same as that of the main object. In step S510, the main object is switched to the object 903.

<Transition Determination Process Based on Overlap between Objects>

Figure 6:
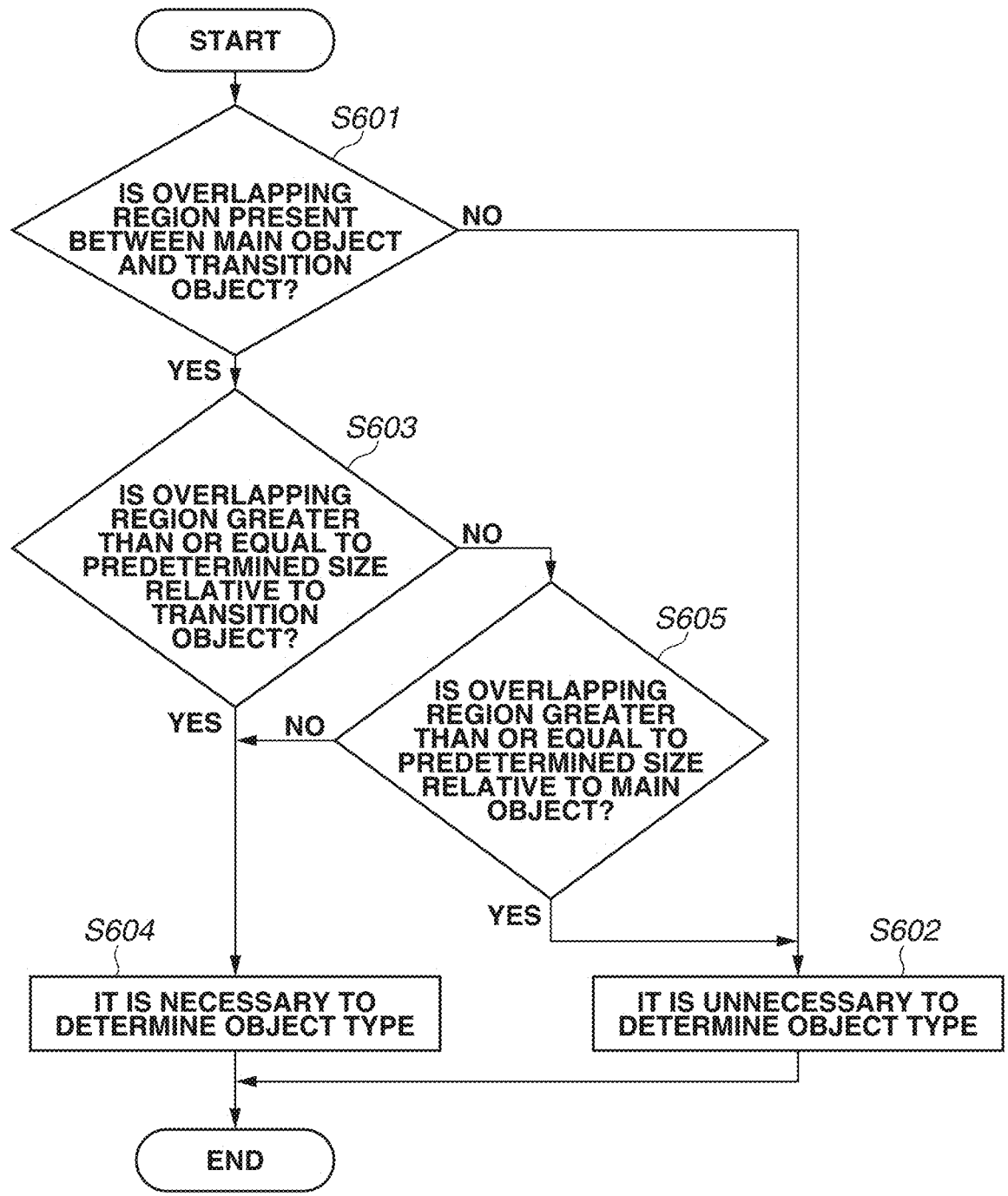
FIG. 6 is a flowchart illustrating a transition determination process based on an overlap between objects according to one or more aspects of the present disclosure.

FIG. 6 is a flow illustrating an example of the transition determination process based on the overlap between the objects.

In step S601, it is determined whether an overlapping region is present between the region of the main object and the region of the transition object. Regarding the object regions for the determination, a region as the AF target in an object, such as a pupil portion of a person or a cockpit portion of an airplane, may be set as an object region. If the AF target is a pupil region of a person, the region of the face or the entire body of the person may be set as the region of the main object. If the AF target is a cockpit portion of an airplane, the region of the entirety of the airplane may be set as the region of the main object. Alternatively, the region of the face or the entire body of the person may be estimated from the pupil region of the person, or the region of the entirety of the airplane may be estimated from the cockpit portion of the airplane, and the estimated region may be set as an object region for the determination. If each of a body portion of a two-wheel vehicle and the head of a person aboard the two-wheel vehicle is detected, a region encompassing the body portion of the two-wheel vehicle and the region of the person aboard the two-wheel vehicle may be estimated and set as an object region.

If it is not determined in step S601 that an overlapping region is present between the regions of the main object and the transition object (No in step S601), the processing proceeds to step S602.

In step S602, it is determined that it is unnecessary to determine the object type of the transition object, and the flow ends.

If it is determined in step S601 that an overlapping region is present between the region of the main object and the region of the transition object (Yes in step S601), the processing proceeds to step S603.

In step S603, it is determined whether the overlapping region is greater than or equal to a predetermined size relative to the transition object. For example, if the proportion of the overlapping region is higher than a predetermined proportion relative to the area of the transition object, it is determined that the overlapping region is greater than or equal to the predetermined size. Alternatively, if the horizontal size or the vertical size of the overlapping region exceeds a size obtained by multiplying the vertical size or the vertical size of the transition object by a predetermined rate, it may be determined that the overlapping region is greater than or equal to the predetermined size.

If it is determined in step S603 that the overlapping region is greater than or equal to the predetermined size relative to the transition object (Yes in step S603), the processing proceeds to step S604.

In step S604, it is determined that it is necessary to determine the object type of the transition object, and the flow ends.

If it is not determined in step S603 that the overlapping region is greater than or equal to the predetermined size relative to the transition object (No in step S603), the processing proceeds to step S605.

In step S605, it is determined whether the overlapping region is greater than or equal to a predetermined size relative to the main object. For example, if the proportion of the overlapping region is higher than a predetermined proportion relative to the area of the main object, it is determined that the overlapping region is greater than or equal to the predetermined size. Alternatively, if the horizontal size or the vertical size of the overlapping region exceeds a size obtained by multiplying the vertical size or the vertical size of the main object by a predetermined rate, it may be determined that the overlapping region is greater than or equal to the predetermined size.

If it is determined in step S605 that the overlapping region is greater than or equal to the predetermined size relative to the main object (Yes in step S605), the processing proceeds to step S602. As an example where it is determined in step S605 that the overlapping region is greater than or equal to the predetermined size relative to the main object, a case is assumed where the region of the transition object contains the entirety of the region of the main object.

If it is not determined in step S605 that the overlapping region is greater than or equal to the predetermined size relative to the main object (No in step S605), the processing proceeds to step S604.

<Transition Permission Determination Based on Object Size>

Figure 8:
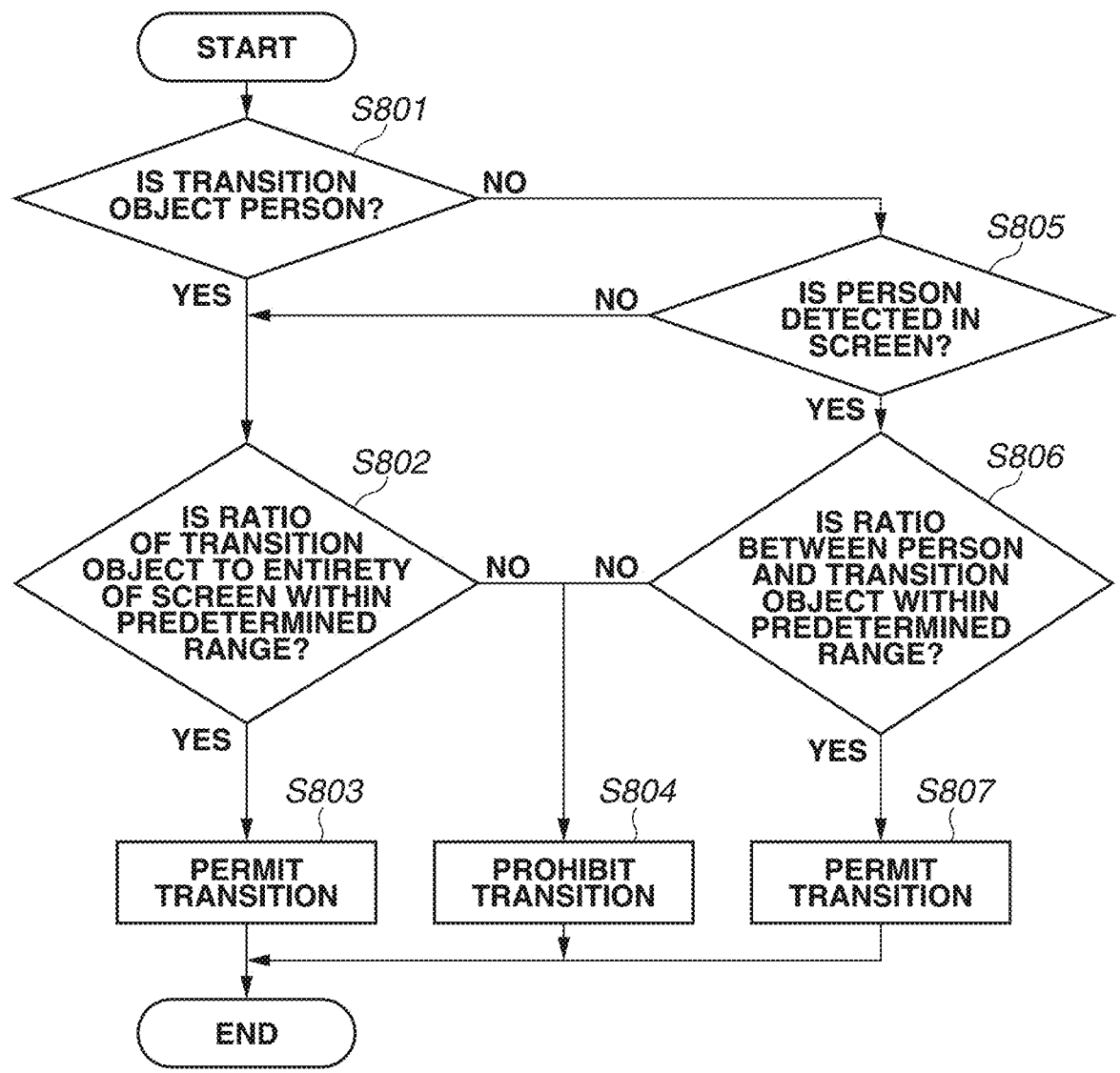
FIG. 8 is a flowchart illustrating a transition permission determination based on an object size according to one or more aspects of the present disclosure.

FIG. 8 is a flow illustrating an example of the transition permission determination based on the object size. The transition permission determination based on the object size is made to prevent the AF frame from transitioning to an object such as a picture printed on an actual object.

In step S801, it is determined whether the transition object is a person.

If it is determined in step S801 that the transition object is a person (Yes in step S801), the processing proceeds to step S802.

In step S802, it is determined whether the region of the transition object is within a predetermined range relative to the entirety of the screen. For example, if the ratio of the area of the transition object to the area of the entirety of the screen is within a predetermined range, it is determined that the region of the transition object is within the predetermined range. If the transition object is a person, the region of the transition object may be the region of the face or the region of a torso portion or the entire body.

If it is determined in step S802 that the region of the transition object is within the predetermined range relative to the entirety of the screen (Yes in step S802), the processing proceeds to step S803.

In step S803, transition based on the object size is permitted, and this flow ends.

If it is not determined in step S802 that the region of the transition object is within the predetermined range relative to the entirety of the screen (No in step S802), the processing proceeds to step S804.

In step S804, transition based on the object size is prohibited, and this flow ends.

If it is not determined in step S801 that the transition object is a person (No in step S801), the processing proceeds to step S805.

In step S805, it is determined whether a person is detected in the screen, regardless of the transition object.

If it is not determined in step S805 that a person is detected in the screen (No in step S805), the processing proceeds to step S802.

If it is determined in step S805 that a person is detected in the screen (Yes in step S805), the processing proceeds to step S806.

In step S806, it is determined whether the ratio between the detected person and the transition object is within a predetermined range. If a plurality of people is detected in the screen, the person most likely to be the main object among the people may be compared with the transition object, or the closest person to the transition object may be compared with the transition object, or the results of comparing all the detected people with the transition object may be used. For example, if the ratio of the area of the region of the transition object to the area of the region of the person is within a predetermined range, it is determined that the ratio between the detected person and the transition object is within the predetermined range.

If it is not determined in step S806 that the ratio between the detected person and the transition object is within the predetermined range (No in step S806), the processing proceeds to step S804.

If it is determined in step S806 that the ratio between the detected person and the transition object is within the predetermined range (Yes in step S806), the processing proceeds to step S807.

In step S807, transition based on the object size is permitted, and the flow ends.

Effects of Present Exemplary Embodiment

As described above, based on the overlap between a transition object and another object and the combination of the object types of the transition object and another object, it is determined whether to cause the transition object to transition as a main object, whereby it is possible to prevent transition to an object unintended by a user.

Other Exemplary Embodiments

While exemplary embodiments of the present disclosure have been described above, the present disclosure is not limited to these exemplary embodiments, and can be modified and changed in various ways within the scope of the present disclosure.

For example, although the transition of an object based on the pressing of the right button or the left button by the user has been described in the present exemplary embodiment, the present exemplary embodiment may be applied to the transition of the main object according to another operation member. Alternatively, when the camera automatically determines whether to cause the main object to transition, it may be determined whether to cause the main object to transition, using the overlap between object regions and the combination of object types.

Although the transition permission determination based on the size is made to prevent the AF frame from transitioning (the main object target from transitioning) to an object unintended by the user in the present exemplary embodiment, the transition permission determination may be made based on the amount of movement of the camera or an object instead. As an example of the transition permission determination based on the amount of movement of the camera or an object, transition to an object likely to come out of the screen is prohibited, or transition to an object that is being panned by the user is permitted.

Alternatively, a scene determination unit that determines an image capturing scene is newly provided and thereby can be utilized in the determination of whether to cause the main object to transition. For example, if the user intends to capture an image of an airplane flying in the sky, a large portion of the image to be captured is expected to include the sky. Based on the region of the sky dominating the captured image, the scene determination unit determines that an image capturing target is the airplane flying in the sky. For example, a case is considered where a picture of a four-wheel vehicle is printed on the exterior of the airplane flying in the sky. At this time, the scene determination unit determines that an image capturing target is the airplane flying in the sky. Then, even if the printed four-wheel vehicle is detected in addition to the airplane, then based on the determination scene, the scene determination unit determines that the four-wheel vehicle is inappropriate as an image capturing target. Then, the scene determination unit can perform control not to permit the transition of the main object from the airplane to the four-wheel vehicle.

On the other hand, it is also possible to perform control to permit transition even in the combination of object types between which transition is not normally permitted, depending on the image capturing scene.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-135293, filed Aug. 26, 2022, which is hereby incorporated by reference herein in its entirety.

What is claimed is:

1. An image processing apparatus comprising:
a memory device that stores a set of instructions; and
at least one processor that executes the set of instructions to function as:
an acquisition unit configured to sequentially acquire images;
a detection unit configured to detect a plurality of objects in the images acquired by the acquisition unit; and
a main object selection unit configured to select a main object from among the plurality of objects,
wherein according to whether a region of any of the plurality of objects overlaps a region of another object and a combination of a type of any of the plurality of objects and a type of the main object, the main object selection unit determines whether to permit any of the plurality of objects to be reselected as a new main object.

2. The image processing apparatus according to claim 1, wherein the detection unit detects at least one of a person, an animal, and a vehicle as an object.

3. The image processing apparatus according to claim 2, wherein in a case where the combination of the type of any of the plurality of objects and the type of the main object is a combination of a person and an animal, the main object selection unit permits any of the plurality of objects to be reselected as the new main object.

4. The image processing apparatus according to claim 2, wherein in a case where the combination of the type of any of the plurality of objects and the type of the main object is a combination of a person and a vehicle, the main object selection unit permits any of the plurality of objects to be reselected as the new main object.

5. The image processing apparatus according to claim 2, wherein in a case where the combination of the type of any of the plurality of objects and the type of the main object is a combination of animals, then according to the combination of the types of the objects, the main object selection unit determines whether to permit any of the plurality of objects to be reselected as the new main object.

6. The image processing apparatus according to claim 2, wherein in a case where the combination of the type of any of the plurality of objects and the type of the main object is a combination of an animal and a vehicle, then according to the combination of the types of the objects, the main object selection unit determines whether to permit any of the plurality of objects to be reselected as the new main object.

7. The image processing apparatus according to claim 2, wherein in a case where the combination of the type of any of the plurality of objects and the type of the main object is a combination of an airplane and a car, the main object selection unit does not permit any of the plurality of objects to be reselected as the new main object.

8. The image processing apparatus according to claim 2, wherein in a case where the combination of the type of any of the plurality of objects and the type of the main object is a combination of a train and a car, the main object selection unit does not permit any of the plurality of objects to be reselected as the new main object.

9. The image processing apparatus according to claim 1, wherein the combination of the type of any of the plurality of objects and the type of the main object is changed according to an operation of a user.

10. The image processing apparatus according to claim 9, wherein the operation of the user is an image capturing preparation instruction, and
wherein during the image capturing preparation instruction, in a case where the type of any of the plurality of objects and the type of the main object are the same type, the main object selection unit permits any of the plurality of objects to be reselected as the new main object.

11. The image processing apparatus according to claim 9, wherein the operation of the user is an autofocus instruction, and wherein during the autofocus instruction, in a case where the type of any of the plurality of objects and the type of the main object are the same type, the main object selection unit permits any of the plurality of objects to be reselected as the new main object.

12. The image processing apparatus according to claim 1, further comprising a scene determination unit configured to determine an image capturing scene,
   wherein the combination of the type of any of the plurality of objects and the type of the main object is changed according to the image capturing scene determined by the scene determination unit.

13. The image processing apparatus according to claim 1, wherein according to a size of any of the plurality of objects, the main object selection unit determines whether to permit any of the plurality of objects to be reselected as the new main object.

14. The image processing apparatus according to claim 1, wherein in a case where any of the plurality of objects includes a region of the main object, the main object selection unit permits any of the plurality of objects to be reselected as the new main object, regardless of the types of the objects.

15. The image processing apparatus according to claim 1, wherein according to an operation unit of a user, the main object selection unit permits any of the plurality of objects to be reselected as the new main object, regardless of the types of the objects.

16. The image processing apparatus according to claim 1, further comprising an amount-of-movement detection unit configured to detect an amount of movement of the image processing apparatus,
   wherein according to at least one of the amount of movement of the image processing apparatus and an amount of movement of any of the plurality of objects, the main object selection unit permits any of the plurality of objects to be reselected as the new main object.

17. The image processing apparatus according to claim 1, further comprising an amount-of-movement detection unit configured to detect an amount of movement of the image processing apparatus,
   wherein according to at least one of the amount of movement of the image processing apparatus and an amount of movement of any of the plurality of objects, in a case where the main object selection unit determines that any of the plurality of objects is being panned, the main object selection unit permits any of the plurality of objects to be reselected as the new main object.

18. An imaging apparatus comprising:
   an imaging sensor configured to output an image; and
   an image processing apparatus comprising:
   a memory device that stores a set of instructions; and
   at least one processor that executes the set of instructions to function as:
   an acquisition unit configured to sequentially acquire images;
   a detection unit configured to detect a plurality of objects in the images acquired by the acquisition unit; and
   a main object selection unit configured to select a main object from among the plurality of objects,
   wherein according to whether a region of any of the plurality of objects overlaps a region of another object and a combination of a type of any of the plurality of objects and a type of the main object, the main object selection unit determines whether to permit any of the plurality of objects to be reselected as a new main object.

19. A control method for controlling an image processing apparatus, the control method comprising:
   sequentially acquiring images;
   detecting a plurality of objects in the images acquired by an acquisition unit; and
   selecting a main object from among the plurality of objects,
   wherein in the selection, according to whether a region of any of the plurality of objects overlaps a region of another object and a combination of a type of any of the plurality of objects and a type of the main object, it is determined whether to permit any of the plurality of objects to be reselected as a new main object.

20. A computer-readable storage medium storing a program for causing a computer to execute a control method for controlling an image processing apparatus, the method comprising:
   sequentially acquiring images;
   detecting a plurality of objects in the images acquired by an acquisition unit; and
   selecting a main object from among the plurality of objects,
   wherein in the selection, according to whether a region of any of the plurality of objects overlaps a region of another object and a combination of a type of any of the plurality of objects and a type of the main object, it is determined whether to permit any of the plurality of objects to be reselected as a new main object.

* * * * *